United States Patent [19]

Conkle

[11] 4,152,819

[45] May 8, 1979

[54] MACHINE FOR DISASSEMBLING WOOD PALLETS

[76] Inventor: Neil E. Conkle, 1000 Clarendon, Columbus, Ohio 43223

[21] Appl. No.: 812,418

[22] Filed: Jul. 1, 1977

[51] Int. Cl.$^2$ ............................................. B23P 19/04
[52] U.S. Cl. .................................... 29/252; 83/477.1
[58] Field of Search ................ 29/252; 83/477, 477.1, 83/4

[56] References Cited

U.S. PATENT DOCUMENTS

| | | | |
|---|---|---|---|
| 3,072,159 | 1/1963 | Warmbrunn | 83/477.1 |
| 3,869,780 | 3/1975 | Binnow et al. | 83/477 |
| 3,916,498 | 11/1975 | Lopez et al. | 29/252 |
| 4,051,588 | 10/1977 | Conkle | 29/252 |

*Primary Examiner*—James L. Jones, Jr.
*Attorney, Agent, or Firm*—Anthony D. Cennamo

[57] ABSTRACT

A machine for disassembling damaged pallets of the wood type. The pallet is machine disassembled in a manner wherein the undamaged deckboards or stringers may again be used in a reassembled pallet. The machine includes a hydraulically driven platform having means for receiving the manually placed pallet in an engaging position with a pair of arms each having a nail breaking free rotating disc positioned thereon. The arms straddle the stringer and when vertically positioned to the appropriate height cause the rotating discs to engage the stringers longitudinally at its nail joining point with the deckboards and baseboards. The discs are not knife sharp and slightly overlapping. Upon engagement of the rotating discs with the nails the forceful action of the hydraulically driven platform causes the hardened nails to break — thereby severing the stringer from the deckboard. A horizontal member cross-positioned behind the discs completes the severing action on the infrequent occasions of failure by the discs.

10 Claims, 8 Drawing Figures

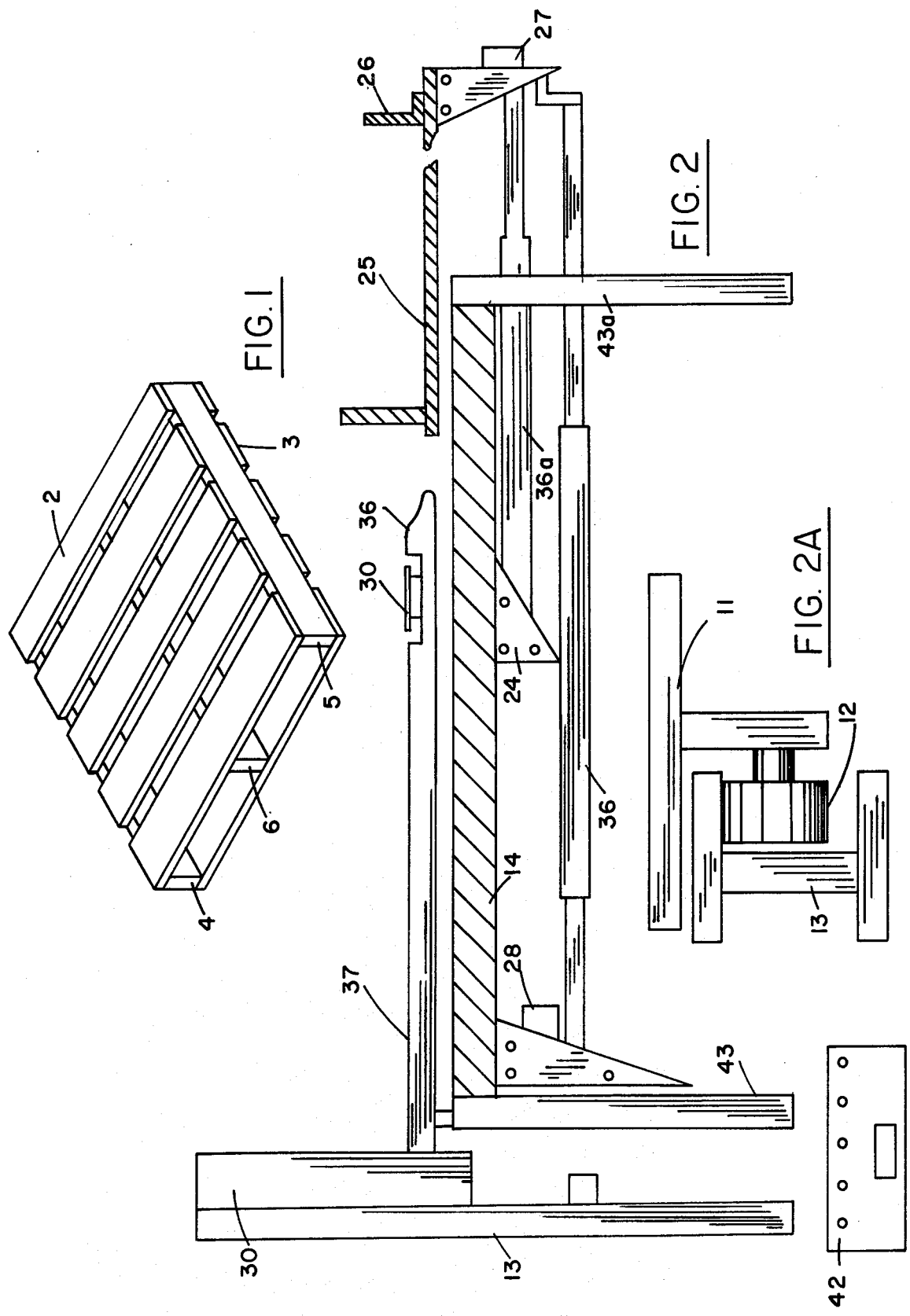

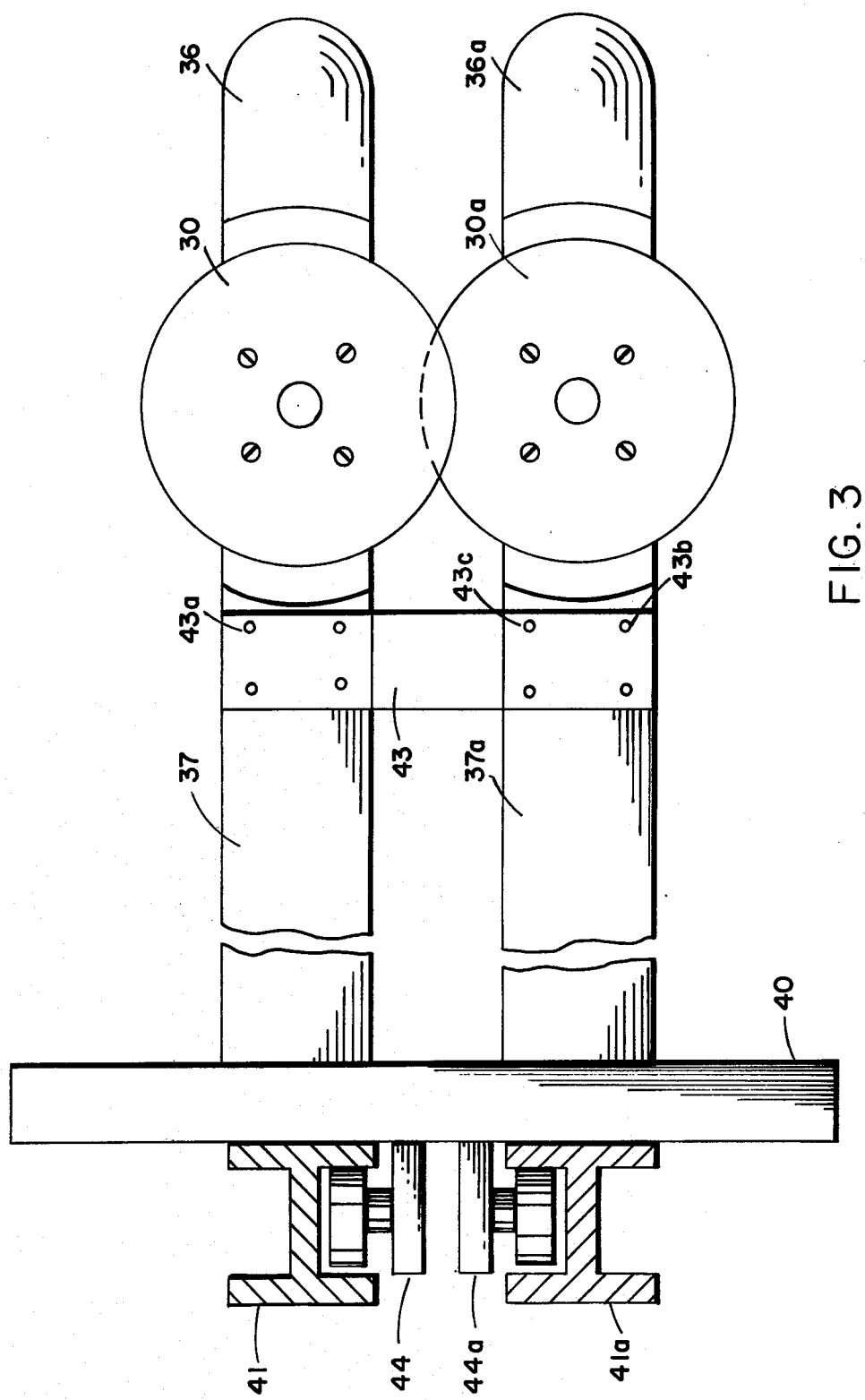

MACHINE FOR DISASSEMBLING WOOD PALLETS

BACKGROUND

Pallets of the wood type have found extensive use in commerce for transporting boxed, crated, or bagged loads from one position to another. The pallets being lifted and dropped from place to place are subjected to rough handling by the lift truck and otherwise. The damage evidence itself in cracked or destroyed baseboards, deckboards or the stringers. It has been found however, that in almost every instance several of the boards may be salvaged and in certain instances stringers may be salvaged.

Wood pallets are generally made of oak or a similar hardwood. In view of the wood aging process the used pallet wood is more valuable than the non-used wood--seasoned versus green lumber. Accordingly, it has been found to be profitable to disassemble the damaged wood pallets, salvage the undamaged lumber, and to reconstruct the pallet from the used lumber. The resulting wood pallet is as good or perhaps better than a newly constructed pallet. However the disassembling has heretofore been primarily by hand which in turn is laborous, time consuming, and costly.

CROSS REFERENCE

There is disclosed in U.S. patent application Ser. No. 636,932, now U.S. Pat. No. 4,051,588 a machine operable to disassemble a wood pallet in a manner wherein the undamaged lumber may be salvaged. The machine of the co-pending application it its most bacis form comprises structure having a platform for resting a pallet thereon. The platform comprises an abutment that restricts the movement of the platform in a lateral or horizontal direction. The structure also includes a plate movably downward to engage the flat deck surface of the pallet and hence restrict the pallet in its vertical movement. Displaced above the platform at a height intermediate the stringer of the pallet is an elongated engaging arm. The arm is initially positioned opposite to that of the aforesaid abutment on the platform and in operation of disassembling the pallet, is hydraulically moved laterally across the platform. The arm engages the first stringer and in continuing its movement separates the stringer from the upper and baseboards. The arm continues in its movement until the second and third stringer are similarly removed from the upper and baseboards. The upper plate is then lifted and the separated boards and stringers are removed for salvaging. The engaging arm may be moved laterally to a position adjacent selective stringers desired to be removed.

PRIOR ART

There are other machines for disassembling pallets particularly those in Class 29, Subclass 200 D. One such U.S. Pat. No. 3,869,780 discloses a pair of rotating knives, positioned relative to one another as closely as possible, and a table movable to engage the knives with the nails at the point of contact between the stringer and the deckboards. This machine eliminates the additional operation of grinding of the nails from the boards; however, it does have its attendant disadvantages.

Initially, it is the practice in assembling pallets to utilize nail driving machines — in lieu of hand driven — to affect production quantities. The nails, fed to nail driving machines by a supporting member, are not the common type nails. These machine driven nails are hardened. Accordingly to cut the nails requires a much higher grade of tool steel for the knives to retain its sharpened edge. Even so, the expensive knives need to be resharpened periodically on a frequent basis. Again because of their hardness and sharpness the blades are very likely to be broken — expecially if the operator is not highly skilled in handling the machine. This in turn not only involves replacing costly blades but of even more significance, results in down-time for the machine.

SUMMARY OF THE INVENTION

The present invention overcomes the above-noted attendant disadvantages of the prior art by taking into consideration that the nails joining the stringers with the deckboards of a pallet are hardened. Particularly the machine of the present invention is operative in a manner that it breaks the nails at this joining point. To accomplish the function, the structure comprises a table and a horizontally driven platform carrying the pallet, and parallel horizontally arms each supporting at their extreme ends free rotating discs. The parallel arms have a spacing sufficient to stradle a pallet stringer with the dull edged discs slightly overlapping to engage the nails on either side. The disc supporting arms are also movable vertically to adjust the height of the discs to the various sizes of the pallets. The hydraulically driven platform force causes engagement of the disc with the nails with a sufficient thrust to break at the joining point of the stringers with the deckboards. To assure proper engagement of the discs with the nails at the appropriate place, each supporting arm, also at the extreme end an advance of the discs, includes a positioning means.

OBJECTS

It is accordingly a principal object of the present invention to provide a new and improved machine operable to disassemble wood pallets by separating the stringers from the upper and baseboards in a manner that is efficient, relatively simple, and without further damage to the lumber.

Another object of the present invention is to disassemble said wood pallets that make unnecessary conventional procedure of removing the nails after disassembling.

A further object of the present invention is to disassemble wood pallets with a machine that utilizes the hardened nail principle.

Other objects and features of the present invention will become apparent from the following detailed description when taken in conjunction with the drawings in which:

BRIEF DESCRIPTION OF THE DRAWINGS

FIG. 1 illustrates a typical wood pallet in perspective.

FIG. 2 is a side view illustration of the overall machine — in a preferred embodiment — of the present invention and FIG. 2A is an exploded view of the bearing supports.

FIG. 3 illustrates in a top view of the free rotating discs stringer engaging arms of the present invention and the bearing support for the vertical movement.

DETAILED DESCRIPTION OF THE DRAWINGS

Figure 4:
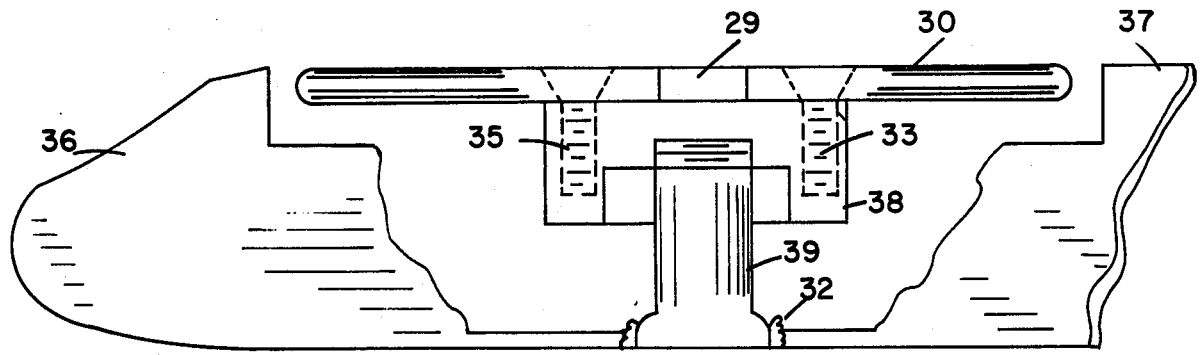
FIG. 4 is a side view showing more explicitly the discs bearing arrangement relative to their supporting arm.
Figure 4A:
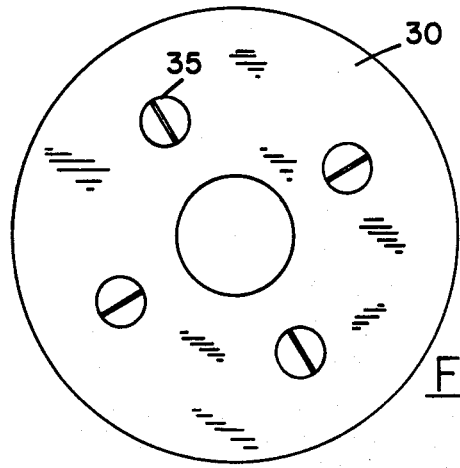
FIG. 4A is a top view of the blade.
Figure 4B:
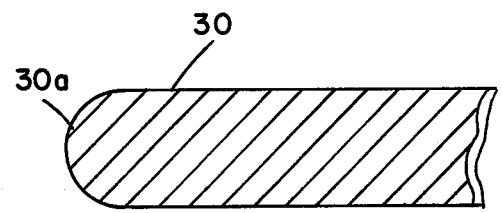
FIG. 4B is a side view thereof.

Referring now to FIG. 1 and 1A, there is illustrated the conventional type of wood pallet in commercial use. The pallet 10 comprises the upper or deckboards 2 and the baseboards 3, separated by end stringers 4 and 5 and intermediate stringer 6. The normal construction of the pallet permits the reversing of the upper and baseboards for the deck.

In commercial use the pallet is subjected to rough usage by mechanized equipment such as a fork lift, also by the material carried and the operator's rough handling. In relatively short periods of time, one or more of the boards and/or stringers become damaged rendering the pallet unsafe for further use.

Pallets used in commerce are made of oak or a similar hardwood. In view of the seasoning process the used hardwood boards are more valuable than boards of new or green lumber. Accordingly it has been found profitable to salvage the undamaged lumber and to reconstruct the pallet. The manual disassembly job is laborous, tedious, costly and time consuming, and what's more, many times results in further or additional damage to the lumber.

The manufacture of pallets is on an assembly line basis using machine driven nails. The nails are distinctive from the common type in that they are hardened; hence the nails are not soft for cutting but are more readily broken upon lateral stress or force. The present invention follows the principle of the hardened nail; that is, the machine of the present invention does not attempt to cut the nails but does take advantage of the fact that the nails may be broken.

With reference in general to the drawings, the machine to accomplish the intended result comprises in its most fundamental structure a platform 25 movingly positioned over table 14 of a sufficient size to accomodate pallets 10 of varying dimensions to be disassembled. A pair of supporting arms 37 and 37a parallel to each other are at one end thereof movably positioned up and down relative to the platform 14, as set forth hereinafter, by a pair suitable drive means 30, and bearing support means 41 and 44. At the other extreme end of the parallel supporting arms 37 and 37a there is positioned discs 30 and 30a, together with their supporting bearing assemblies 31 and 31a. The bearings permit rotation of the discs 37 and 37a in a horizontal plane to engage and break the nails in the pallet.

With particular reference to FIGS. 4, 4A, 4B and 5 the overall structure of the nail engaging discs 30 and 30a is shown more explicitly. The discs 30 and 30a are rotatively supported by bearing assemblies 31 and 31a. The discs 30 and 30a are fixed to their bearing assembly by bolts 33 and 35. These bolts are recessed to give unrestricted engagement of the discs with the pallet nail.

The bearing assembly comprises outer rotating housing 38 having fixed thereto the severing disc 30 by bolts 33 and 35, and by the center bolt 29. The rotating housing 38 is positioned on stanchion 39 fixedly secured to the support 31 that is in actuality a part of the arm 37, such as by welding at 32.

In view of the extreme work force of the discs 30 and 30a upon engagement with the pallet nail it is not unrealistic to conceive breaking a disc. Accordingly, to minimize such occurrences the bolt 29 is made of soft metal, i.e. becomes a shear pin. Further upon breaking, the bolt 29 is quickly and easily removed and replaced into the fixed nut 39.

Figure 5:
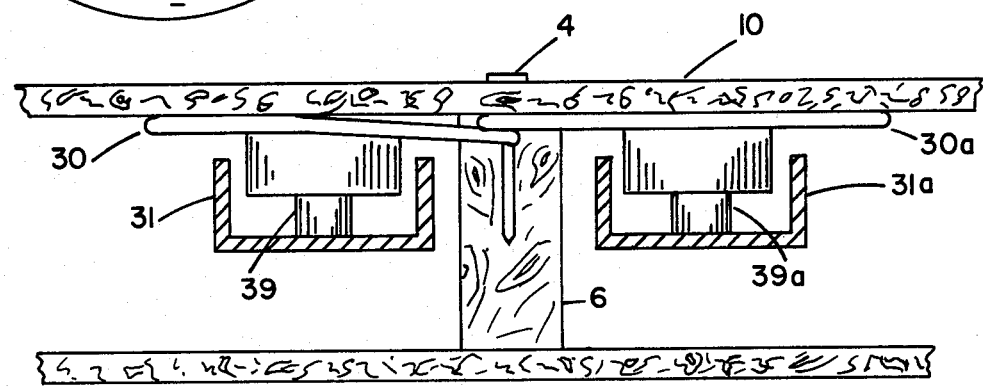
FIG. 5 is a crosssectional end view of the blade engagement with the stringers of the pallet.

Referring to FIG. 5 with particularity, the discs 30 and 30a are shown in their operative position. To be noted specifically the discs 30 and 30a are not edge-to-edge, to the contrary the edges are forceably displaced vertically to be slightly overlapping. This displacement is a force-type fit one over the other. The discs 30 and 30a are made of steel, however, they are not as hardened as is required by a metal cutting knife. Also the flatness, roundness, accuracy, etc. of the discs 30 and 30a is not critical. As shown by the crosssectional view of FIG. 4B the edge 30b of the disc is not sharp and in actuality is rounded. This is significant in that when taken in conjunction with the above noted configurations, if a discs does break it can be welded and reused.

With reference to FIG. 2, there is illustrated hydraulic cylinder drive means 36 and 36a secured to the extreme ends of table supports 43 and 43a. The hydraulic cylinder drive means 36 and 36a are separably operable to drive platform 25 in the to and fro horizontal directions. Platform 25 carries thereon the pallet 10 to be disassembled. The pallet 10 is placed on the pallet manually in a position predetermined by the setting of guides 26. These guides are adjustable to accomodate pallets of varying sizes. The guides 26 assure that the discs 30 and 30a engage the pallet 10 at the joining of the stringer 5 with the deckboard.

The platform 25 is supported and movably positoned on table 14 by multiple bearing supports as shown in FIG. 2A. The structure 13 is essentially an "I" beam 13 fixed to the table, whereas the "T" structure 11 secured to the platform has the bearing 12 secured thereto to rotatably engage the "I" beam 13.

In operation of the preferred embodiment illustrated, a pallet 10 is placed on the platform 25 with the one end of the stringers 4, 5, or 6 facing the severing mechanism. Through the operator control panel 42 the vertical drive hydraulic cylinder 30 is activated to position the parallel supporting arms 37 and 37a at a height wherein the discs 30 and 30a supported thereby are that of where the stringer meets the deckboard. As the pallet 10 is held into position by guides 26 the operator next activates the horizontal drive hydraulic cylinder 27 to cause engagement of the discs with the pallet stringer top and deckboard bottom and to the nails holding the same — as shown explicitly in FIG. 5. The horizontal movement of the platform is continued until all nails holding that particular stringer and deckboards are broken. The platform 25 is then retracted by activation of drive 28 and cylinder 36. The operation is repeated for each stringer and then the pallet is turned over and the operation for each stringer is again repeated.

With particular reference to FIG. 3 again, there is illustrated the crosspiece severing bar 43. The rotating discs 30 and 30a are operable in almost every instance to break the nails; there are instances, however, where a particularly hard nail is pushed or whatever. In these instances the platform 25 continues in its horizontal movement until said missed nail engages the bar 43. The bar 43 with the force of drive completes the breaking operation.

The power source for the driving cylinders 27 and 28 must, of course, be of sufficient force to perform the necessary operation. It has been found in that since the pallets are of hardwood and the hardened nails are in most instances rusty, the power to effect the operation is substantial.

Prior to the machine of the present invention and that of the aforesaid co-pending patent application, the disassembling of the pallets was a hand operation. Even discounting the fact of additional damage, the time for hand labor was found to be six times that of the machine.

With the nails holding the boards to the stringers removed, the destroyed lumber is disposed of and the umdamaged lumber is reused in the reconstruction of the pallets.

Although a certain embodiment and construction of my machine has been shown and described, it is to be understood that modifications may be had thereto, without departing from the true spirit and scope of the invention.

What is claimed is:

1. A machine for disassembling wood pallets of the type having deck baseboards and stringers comprising a structure for breaking the nails holding said boards to said stringers including;

a platform for placing said pallet thereon;

engaging arm means nail breaking means including a pair of discs;

means for mounting said pair of discs on the end of said arm engaging means in a side by side relationship and in a displaced horizontal plane relative to one another so that their edges overlap, means for positioning said arm engaging means above said platform to a height wherein said discs are on a plane equivalent to that of the joining point of said stringers to said baseboards when said pallet is placed on said platform;

drive means for moving said platform horizontally to engage said discs with the nails extending from said deckboards into said stringer and to continue said movement until all of said nails are broken.

2. The machine of claim 1 wherein said engaging arm means is a pair of arms in parallel relationship and wherein one of said pair of discs are mounted on each of said parallel arms.

3. The machine of claim 2 wherein said mounting of said discs is respective bearing supports.

4. The machine of claim 1 wherein said drive means for said platform is a pair of hydraulic cylinders to move said platform in an engaging position and then to return the platform to a start position.

5. The machine of claim 1 wherein said displacement of said discs is an overlap of the edges thereof in the order of $\frac{1}{8}$ inch to $\frac{1}{4}$ inch.

6. The machine of claim 2 wherein said parallel arms each comprise at its extreme ends a positioning means for engaging said discs with said pallet.

7. The machine of claim 3 wherein said bearing means for mounting said discs further comprises a bolt securing said disc to said bearing and wherein said bolt comprises a sheartype pin.

8. The machine of claim 1 further comprising a plurality of variable positioning means on said platform to position and hold in place said pallets of varying sizes.

9. The machine of claim 2 further comprises a horizontal breaking bar positioned rearwardly of said discs on said parallel arms.

10. The machine of claim 9 wherein said bar is on the same plane as said discs.

* * * * *